W. H. SHERROD.
SOIL PULVERIZER.
APPLICATION FILED MAY 1, 1919.
1,349,858.
Patented Aug. 17, 1920.
2 SHEETS—SHEET 1.
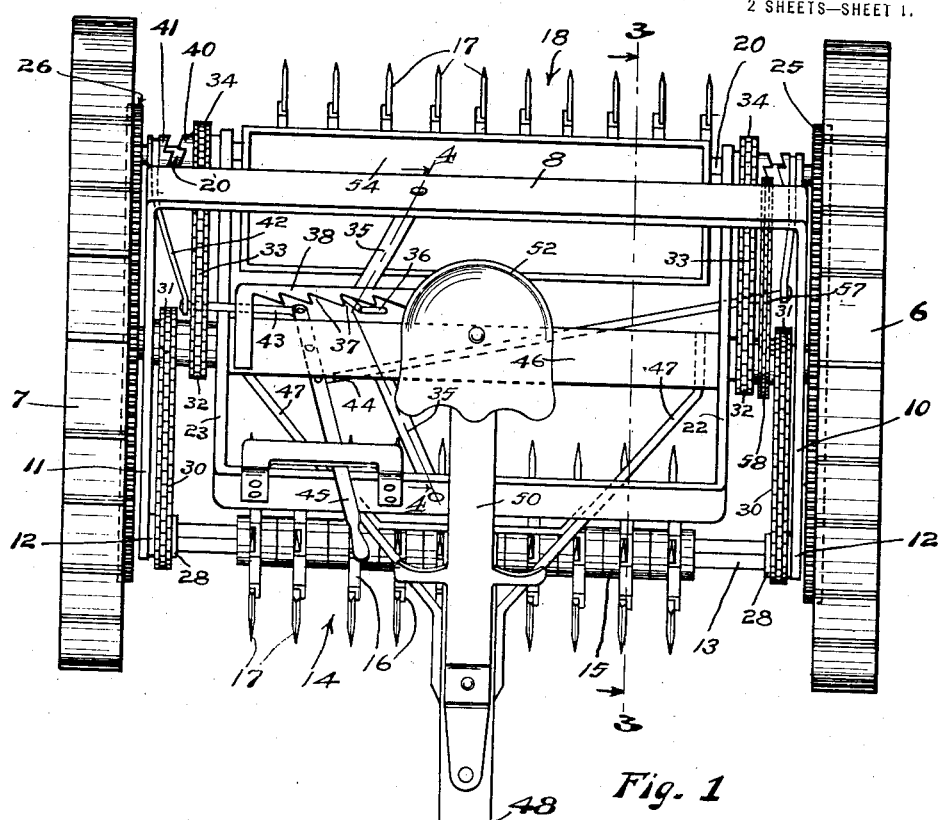
Fig. 1
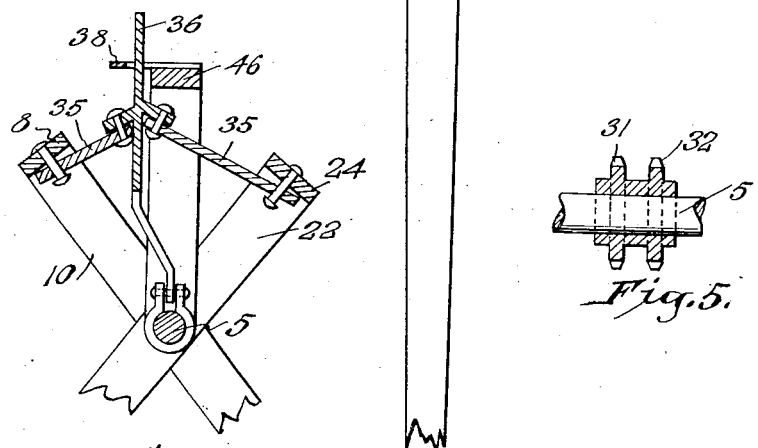
Fig. 4.
Fig. 5.
Inventor
William H. Sherrod
Attorney
Fred C. Mathewy

W. H. SHERROD.
SOIL PULVERIZER.
APPLICATION FILED MAY 1, 1919.

1,349,858.

Patented Aug. 17, 1920.
2 SHEETS—SHEET 2.

Inventor
William H. Sherrod
Attorney
Fred C. Matheny

UNITED STATES PATENT OFFICE.

WILLIAM H. SHERROD, OF SEATTLE, WASHINGTON.

SOIL-PULVERIZER.

1,349,858.   Specification of Letters Patent.   Patented Aug. 17, 1920.

Application filed May 1, 1919. Serial No. 293,982.

*To all whom it may concern:*

Be it known that I, WILLIAM H. SHERROD, a citizen of the United States, and resident of Seattle, in the county of King and State of Washington, have invented certain new and useful Improvements in Soil-Pulverizers, of which the following is a clear and exact specification.

My invention relates to improvements in agricultural implements and the object of my improvement is to provide a soil pulverizer having a plurality of cylindrical cutter members that are adapted to be rotated at a relatively high rate of speed to pulverize the soil very finely and to prepare a seed bed that will be free from clods and lumps and that will retain moisture effectively.

A further object of my invention is to provide an implement of this nature that is mounted on wheels upon which it may be moved and that is provided with gear mechanism which is connected with the wheels and arranged to rotate the cutter members at a relatively high rate of speed and in a direction opposite to the direction of rotation of the wheels.

A still further object is to provide simple and efficient means for adjustably supporting the rotary cutter members in such a manner that they may be caused to dig into the ground or may be lifted into a position entirely clear of the ground.

A still further object is to provide clutch mechanism for throwing the cylindrical cutting members into and out of gear, the clutch mechanism being so arranged that it will compensate for such differences in the relative speed of rotation of the two driving wheels as may occur when the implement is rounding a curve.

The invention consists in the novel construction, adaptation and combination of parts of a soil pulverizer as will be more clearly hereinafter described and claimed.

Figure 2:
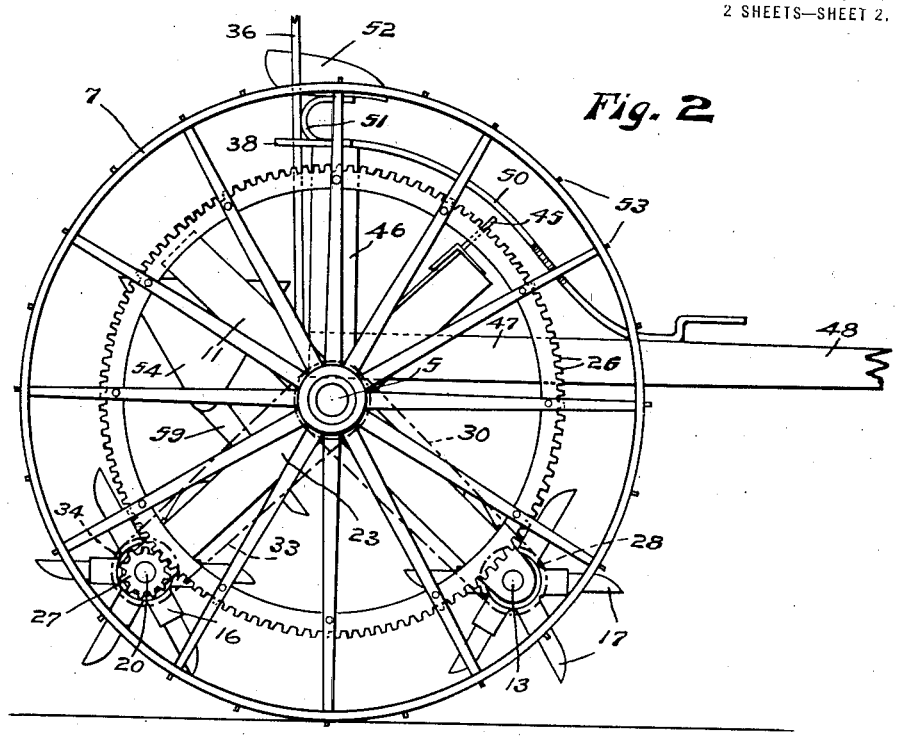
Figure 3:
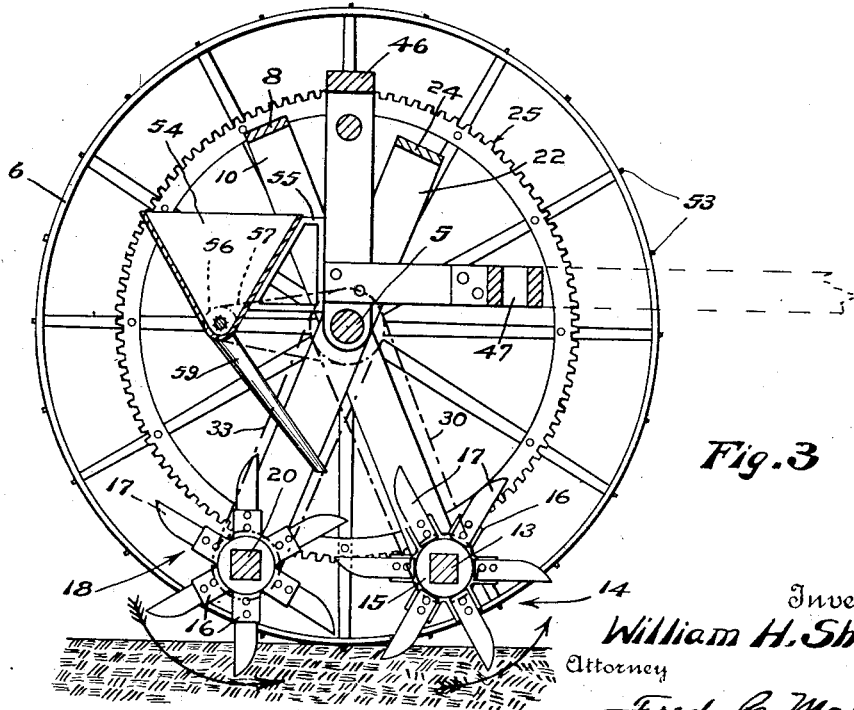

In the accompanying drawings Figure 1 is a plan view of a soil pulverizer constructed in accordance with my invention; Fig. 2 is a view in side elevation of the same and Fig. 3 is a view in sectional elevation substantially on a broken line 3—3 of Fig. 1, the cylindrical cutting members being shown in a different position than they are in Figs. 1 and 2; Fig. 4 is a fragmentary view partly in cross section and partly in elevation illustrating the lever arrangement for regulating the depth of cut of the rotary diggers and Fig. 5 is a fragmentary sectional view illustrating part of the driving mechanism for the diggers.

Like reference numerals designate like parts throughout the several views.

Referring to the drawings numeral 5 designates a transverse axle upon the opposite ends of which are journaled driving wheels 6 and 7. Mounted for swinging movement upon the axle 5 is a U-shaped member comprising a medial section 8 and two oppositely disposed end members 10 and 11 that extend downwardly and are provided on their lower ends with bearings 12 wherein are journaled the opposite ends of a transverse shaft 13 that carries a rotary cylindrical cutting member that is designated in a general way by the numeral 14.

The cylindrical cutting member 14 is preferably formed of a plurality of sections each of which comprises a hub 15 provided with a plurality of radial arms 16 to which are secured cutting knives or blades 17. That portion of the shaft 13 between the bearings 12 is preferably of square or irregular cross sectional shape and is arranged to pass through square or irregularly shaped holes in the hubs 15 as more clearly shown in Fig. 3, the arrangement being such that a plurality of the sections of which the cylindrical cutting member 14 is composed may be slipped onto the shaft 13 and will be rotated by the turning of said shaft.

In addition to the cylindrical cutting member 14 my pulverizer also employs another cylindrical cutting member designated generally by the numeral 18. The sections of which the cutter member 18 is composed are similar to the sections of which the cutter member 14 is composed and such sections are carried on a transverse shaft 20 that is journaled in the lower ends of a U-shaped support comprising two side members 22 and 23 that are connected with each other by an integral cross member 24, thereby forming a rigid structure which insures that the two end members 22 and 23 will move simultaneously.

The cylindrical cutter member 18 is driven by two large gear wheels 25 and 26 that are secured to the wheels 6 and 7, respectively, and are arranged to mesh with pinions 27, only one of which is shown, on the opposite ends of the transverse shaft 20.

The opposite ends of the shaft 13 that carries the cylindrical cutting member 14 are provided with sprocket wheels 28 that are connected by sprocket chains 30 with other sprocket wheels 31 that are journaled on the axle 5. The sprocket wheels 31 are integral with or rigidly secured to sprocket wheels 32 that are connected by sprocket chains 33 with sprocket wheels 34 on the shaft 20, so that when the shaft 20 is rotated the shaft 13 will be rotated simultaneously and in the same direction therewith.

The transverse portions 8 and 24 of the U-shaped members that support the rotary cutters are arranged at a considerable distance above the axle 5 and such transverse members are connected by links 35 with a lever arm 36 that is pivotally secured to the transverse axle 5 and is arranged to engage within notches 37 in a guide member 38 so that it may be set in any desired position. When the lever arm 36 is moved to the left as viewed in Fig. 1, the transverse portions 8 and 24 of the U-shaped members will be moved toward each other and the rotary cutting members will be moved downwardly and toward each other into a position as shown in Fig. 3, thereby causing such rotary cutting members to dig into the ground. When the lever 36 is moved to the right as viewed in Fig. 1 the toggle action of the links 35 will cause the horizontal members 8 and 24 to be moved apart and the rotary cutting members 14 and 18 to be moved apart and lifted into a position as shown in Fig. 2 thereby raising such cutting members out of the ground.

The sprocket wheels 34 are each preferably loosely mounted on the shaft 20 and are provided with a clutch element 40 that are arranged to be engaged by oppositely disposed clutch elements 41 that are splined on the shaft 20 so that when the clutch elements 40 are out of engagement with the clutch elements 41 the rotary cutting members will not be rotated when the wheels 6 and 7 are turned.

The clutch members 41 are arranged to be moved lengthwise of the shaft 20 by flat springs 42 that are connected with links 43 and 44 which are actuated by a lever arm 45. The springs 42 are stiff enough so that when the lever arm 45 is moved such springs will normally move the clutch elements 41 but are sufficiently flexible so that if one of the driving wheels is rotated at a faster rate of speed than the other wheel the spring will permit the clutch member 41 to ride over the clutch member 40 without exerting a strain on the shaft 20.

The axle 5 carries a U-shaped frame member 46 to which are secured angularly disposed forwardly projecting bracket members 47 that are arranged to support a tongue 48 by which the implement may be moved and guided. The upper transverse portion of the bracket member 46 is connected with the tongue 48 by a curved brace member 50 the upper end of which may terminate in, or is rigidly secured to, a spring 51 that serves as a support for a seat 52 whereon the operator of the machine may ride.

The wheels 6 and 7 are preferably provided with lugs 53 which give them sufficient tractive force to rotate the cutting members 14 and 18.

If desired a seeder box 54 may be secured by brackets 55 at the supporting member 46 in substantially the position shown in Figs. 2 and 3 and such seeder box may be provided at a plurality of intervals with spouts 59 that are arranged to deliver seed onto the ground between the cutting members 14 and 18. The seeder box 54 may be provided with any desired form of feed which may be driven by means of sprocket wheel 56 which is connected by a sprocket chain 57 with another sprocket wheel 58 on the axle 5, the sprocket wheel 58 being rigidly connected with the sprocket wheels 32 and 33.

In operation this device will preferably be used on clean or newly plowed ground for the purpose of pulverizing the soil and preparing a suitable seed bed. When the device is drawn over the ground the wheels 6 and 7 will be rotated and will act through the gears 25 and 26 and pinions 27 and the several sprocket chains and gears to rotate the cutting members 18 and 14 in the direction indicated by the arrows.

By the foregoing description it will be seen that the cutting members 14 and 18 are rotated in a direction opposite to the direction of rotation of the wheels 6 and 7 thus causing the cutting knives 17 to be moving in the same direction as the implement at the time when such knives intersect the soil.

The knives 17 on the two cutting members are offset with respect to each other so that they will cut in different paths thereby serving to thoroughly pulverize the soil, and leave a seed bed that will be free from clods and lumps and that will not dry out quickly.

It is obvious that changes in the form of construction and arrangement of the various parts of this device may be resorted to within the scope of the claims.

What I claim is:

1. A soil pulverizer comprising an axle member, a wheel journaled on each end thereof, two cylindrical cutter members each provided with axial shafts that are arranged substantially parallel with said axle member, each of said cylindrical cutter members having radially projecting knives arranged in circular rows and the knives on one of said cutter members being offset with respect to the knives on the other of said cutter members, U-shaped members swingingly mounted on said axle, the said cylindrical cutter members being journaled in the lower ends of the said U-shaped members, lever means connected with the upper portions of said U-shaped members for swinging the same about said axle to raise and lower said cutter members, gear means connected with said wheels for rotating said cutter members, and clutches for disengaging said gear means.

2. An agricultural implement comprising a frame, an axle, wheels on said axle, two cutter supports each comprising two parallel side arms rigidly connected by a transverse end member, the said side arms of each support being arranged in crossed relation and pivoted on said axle at their points of intersection, a transverse cutter shaft journaled in the bottom ends of each pair of side arms, radial knife members projecting from each of said cutter shafts, a lever mounted on said frame, toggle links connecting the top members of said cutter supports with said lever, externally toothed gearwheels of relatively large size, secured to the wheels of said implement, pinions on one of said cutter shafts and arranged to mesh with said gearwheels, clutches for selectively locking said gearwheels to said cutter shaft, and link belt mechanism connecting the driven cutter shaft with the other cutter shaft.

Signed at Seattle, Washington, this 17th day of April, 1919.

WILLIAM H. SHERROD.